(12) United States Patent
Li et al.

(10) Patent No.: US 12,135,050 B2
(45) Date of Patent: Nov. 5, 2024

(54) NUT FASTENER ASSEMBLY

(71) Applicant: ILLINOIS TOOL WORKS INC., Glenview, IL (US)

(72) Inventors: Zhilin Li, Shanghai (CN); Weibin Liu, Shanghai (CN); Chunjie Lv, Shanghai (CN)

(73) Assignee: Illinois Tool Works Inc., Glenview, IL (US)

(*) Notice: Subject to any disclaimer, the term of this patent is extended or adjusted under 35 U.S.C. 154(b) by 226 days.

(21) Appl. No.: 17/459,620

(22) Filed: Aug. 27, 2021

(65) Prior Publication Data
US 2022/0065284 A1 Mar. 3, 2022

(30) Foreign Application Priority Data
Aug. 31, 2020 (CN) .......................... 202010895158.5

(51) Int. Cl.
*F16B 37/04* (2006.01)
*F16B 37/08* (2006.01)

(52) U.S. Cl.
CPC ........ *F16B 37/041* (2013.01); *F16B 37/0807* (2013.01); *F16B 2200/403* (2018.08)

(58) Field of Classification Search
CPC ................ F16B 37/041; F16B 37/0807; F16B 37/044; F16B 37/043; F16B 2200/403
USPC .................................. 411/174, 546, 112, 970
See application file for complete search history.

(56) References Cited

U.S. PATENT DOCUMENTS

| | | | | |
|---|---|---|---|---|
| 2,115,312 A | * | 4/1938 | Lombard | F16B 37/041 411/548 |
| 2,243,923 A | * | 6/1941 | Swanstrom | F16B 37/044 411/113 |
| 2,409,209 A | * | 10/1946 | Johnson | F16B 37/044 411/111 |
| 2,727,552 A | * | 12/1955 | Chvesta | F16B 37/044 411/112 |
| 2,967,556 A | * | 1/1961 | Jaworski | F16B 37/044 411/112 |
| 3,035,624 A | * | 5/1962 | Jaworski | F16B 37/044 411/112 |

(Continued)

FOREIGN PATENT DOCUMENTS

| | | | | |
|---|---|---|---|---|
| DE | 102006034463 B3 | * | 1/2008 | ............ F16B 5/0233 |
| DE | 202006014151 U1 | * | 3/2008 | ............ F16B 37/043 |

(Continued)

*Primary Examiner* — William D Hutton, Jr.
*Assistant Examiner* — Dil K. Magar
(74) *Attorney, Agent, or Firm* — Quarles & Brady LLP

(57) ABSTRACT

A nut fastener assembly includes a nut assembly and a fastening clip. Opposite sides of the bottom of the nut assembly are provided with a pair of protrusions. The fastening clip includes a pair of lugs arranged on opposite ends of the fastening clip and extending towards the nut assembly, and a pair of receiving channels configured to respectively penetrate the pair of lugs. At least one of the pair of lugs is an adjustable lug including a blocking part and an elastic part. The distal end of the elastic part is movable relative to the distal end of the blocking part. The corresponding protrusion in the pair of protrusions can enter the corresponding receiving channel through a space between the distal end of the blocking part and the distal end of the elastic part to be held in the receiving channel.

10 Claims, 10 Drawing Sheets

(56) References Cited

U.S. PATENT DOCUMENTS

| | | | | |
|---|---|---|---|---|
| 3,126,038 A * | 3/1964 | Jaworski | ............... | F16B 37/044 411/112 |
| 3,695,324 A * | 10/1972 | Gulistan | ................ | B23P 11/00 411/111 |
| 3,765,078 A * | 10/1973 | Gulistan | ................ | B23P 11/00 29/523 |
| 4,219,064 A * | 8/1980 | Lozano | ................ | F16B 37/044 411/103 |
| 4,227,561 A * | 10/1980 | Molina | ................ | F16B 37/044 411/103 |
| 4,826,374 A * | 5/1989 | Baglin | ................ | F16B 37/044 411/103 |
| 4,828,440 A * | 5/1989 | Anderson | ............. | F16B 37/043 411/85 |
| 4,863,327 A * | 9/1989 | Poupiter | ............... | F16B 37/044 411/85 |
| 4,895,484 A * | 1/1990 | Wilcox | ................ | F16B 37/044 411/85 |
| 5,146,668 A * | 9/1992 | Gulistan | ................ | B21K 1/70 72/356 |
| 5,193,643 A * | 3/1993 | McIntyre | ................ | B60K 5/12 180/312 |
| 5,405,228 A * | 4/1995 | Reid | .................... | F16B 37/044 411/113 |
| 6,254,161 B1 * | 7/2001 | Wochaski | ............. | F16B 37/041 248/225.11 |
| 6,474,917 B2 * | 11/2002 | Gauron | ................ | F16B 37/044 |
| 6,918,725 B2 * | 7/2005 | Gauron | ................ | F16B 37/043 411/112 |
| 7,059,816 B2 * | 6/2006 | Toosky | .................. | B23P 9/025 411/181 |
| 7,114,900 B2 * | 10/2006 | Toosky | ................ | F16B 37/065 411/181 |
| 7,575,404 B2 * | 8/2009 | Toosky | ................ | F16B 37/062 411/113 |
| 7,648,319 B1 * | 1/2010 | Ochoa | .................. | F16B 37/044 411/174 |
| 7,823,262 B2 * | 11/2010 | Toosky | ................ | F16B 37/044 29/523 |
| 8,132,992 B2 * | 3/2012 | Van Walraven | ...... | F16B 37/046 411/84 |
| 8,177,466 B2 * | 5/2012 | Csik | ...................... | F16B 37/043 411/174 |
| 8,231,317 B2 * | 7/2012 | De Gelis | ............... | F16B 5/0266 411/188 |
| 8,506,222 B2 * | 8/2013 | Reid | .................... | F16B 37/044 411/501 |
| 8,647,035 B2 * | 2/2014 | Bakken | ................ | F16B 17/006 411/108 |
| 9,114,449 B2 * | 8/2015 | Ross | .................... | F16B 37/044 |
| 9,267,529 B2 * | 2/2016 | Tejero Salinero | ..... | F16B 37/041 |
| 9,816,547 B2 * | 11/2017 | Costabel | .............. | F16B 37/044 |
| 9,939,005 B2 * | 4/2018 | Foenander | ........... | F16B 37/044 |
| 2005/0025606 A1 * | 2/2005 | Toosky | ................... | B23P 9/025 411/181 |
| 2006/0280579 A1 * | 12/2006 | Seidl | ..................... | F16B 5/0233 411/546 |
| 2007/0223991 A1 * | 9/2007 | Motsch | ................ | F16B 37/041 403/22 |
| 2007/0224016 A1 * | 9/2007 | Toosky | ................ | F16B 37/062 411/108 |
| 2008/0101888 A1 * | 5/2008 | Toosky | ................ | F16B 37/062 411/108 |
| 2008/0247842 A1 * | 10/2008 | Motsch | ................ | F16B 37/044 411/174 |
| 2011/0150599 A1 * | 6/2011 | Bakken | ................ | F16B 17/006 29/525.11 |
| 2011/0182692 A1 * | 7/2011 | Reid | ....................... | B23P 9/025 29/523 |
| 2011/0311331 A1 * | 12/2011 | Tejero Salinero | ...... | F16B 37/02 411/175 |
| 2012/0317787 A1 * | 12/2012 | Ross | ...................... | B21D 39/04 411/174 |
| 2013/0069345 A1 * | 3/2013 | Williams | ............... | B60R 21/217 280/728.2 |
| 2015/0330427 A1 * | 11/2015 | Johnson | ................ | F16B 5/0233 411/34 |
| 2017/0138388 A1 * | 5/2017 | Figge | .................... | F16B 37/041 |
| 2018/0216650 A1 * | 8/2018 | Costabel | .............. | F16B 37/043 |

FOREIGN PATENT DOCUMENTS

| | | | | |
|---|---|---|---|---|
| DE | 102013202582 A1 * | 8/2014 | ............ | F16B 39/225 |
| DE | 102018108830 A1 | 10/2018 | | |
| DE | 102018201496 A1 * | 8/2019 | ............ | F16B 5/0233 |
| JP | 2019113091 A * | 7/2019 | ................ | F16B 5/02 |

\* cited by examiner

NUT FASTENER ASSEMBLY

CROSS REFERENCE TO RELATED APPLICATIONS

This application claims priority to Chinese Application Serial No. 201910514226.6 and Chinese Application Serial No. 202010895158.5, filed Aug. 31, 2020, which is hereby incorporated by reference in its entirety.

FIELD OF THE DISCLOSURE

The present application relates to a nut fastener, and in particular to a compensation nut fastener assembly configured to adapt to a clearance between components (e.g., panels).

BACKGROUND

In various industrial applications, components are connected together by using fasteners. In some applications, when there is a certain separation distance between a fastening point and a mounting point, a fixing operation can be performed with the use of a suitable fastener without changing the separation distance.

A nut fastener with a length adjustment function is generally used to adapt to or compensate for the clearance between the components. The length of the nut fastener can be adjusted by means of rotating the fastener.

SUMMARY

The present application provides a nut fastener assembly, which can adapt to a clearance between mounting positions. Such a nut fastener assembly comprises a nut assembly and a fastening clip. The opposite sides of the bottom of the nut assembly are provided with a pair of protrusions which are separately formed by protruding outwards. The fastening clip comprises a first clip portion, a pair of lugs and a pair of receiving channels. The nut assembly is connected to the first clip portion by means of the pair of protrusions. The pair of lugs are respectively arranged on the opposite ends of the first clip portion and extend towards the nut assembly. The pair of receiving channels are configured to respectively penetrate the pair of lugs and configured to respectively receive the pair of protrusions of the nut assembly such that the nut assembly is connected to the first clip portion. At least one of the pair of lugs is an adjustable lug; the adjustable lug comprises a blocking part and an elastic part. The proximal end of the blocking part and the proximal end of the elastic part are separately connected to the first clip portion on the opposite sides of the corresponding receiving channel. The distal end of the blocking part and the distal end of the elastic part extend towards each other. The distal end of the elastic part is configured to be movable relative to the distal end of the blocking part under the drive of an external force, such that the corresponding protrusion in the pair of protrusions enters the corresponding receiving channel through a space between the distal end of the blocking part and the distal end of the elastic part. When the distal end of the elastic part is in a free state, the protrusion having entered the receiving channel is held in the receiving channel by means of the distal end of the elastic part.

According to the nut fastener assembly described above, the distal end of the elastic part extends to a position below the distal end of the blocking part and an inlet in communication with the receiving channel is defined between the distal end of the elastic part and the distal end of the blocking part. The height of the inlet is adjustable as the distal end of the elastic part moves. When the distal end of the elastic part is in the free state, the height of the inlet is less than the thickness of the corresponding protrusion in the pair of protrusions.

According to the nut fastener assembly described above, the elastic part obliquely extends upwards from the proximal end of the elastic part to the distal end of the elastic part, with the distal end of the elastic part being higher than the first clip portion.

According to the nut fastener assembly described above, the blocking part comprises an extension part located above the receiving channel and a connection part connecting the extension part to the first clip portion, with the connection part and the elastic part being respectively located on the opposite sides of the receiving channel.

According to the nut fastener assembly described above, the pair of protrusions are sized such that, after the nut assembly is mounted in place in the fastening clip, the pair of protrusions can protrude out of the pair of receiving channels.

According to the nut fastener assembly described above, the length of the receiving channels is greater than that of the pair of protrusions, such that the nut assembly can rotate a certain angle in the receiving channels.

According to the nut fastener assembly described above, the inner side of the elastic part is flush with the inner side of the blocking part.

According to the nut fastener assembly described above, the bottom of the nut assembly is provided with limiting parts which are respectively located on two sides of each of the pair of protrusions. The limiting parts are configured to cooperate with the inner side of the pair of lugs to limit the rotation of the nut assembly.

According to the nut fastener assembly described above, one of the pair of lugs is the adjustable lug, and the other is a fixed lug. The fixed lug comprises an extension part located above the receiving channel, and a first connection part and a second connection part which connect the extension part to the first clip portion. The first connecting portion and the second connecting portion are respectively located on the opposite sides of the receiving channel.

According to the nut fastener assembly described above, the fastening clip is integrally formed of a metal material by means of a stamping process or is integrally formed of a plastic material by means of an injection molding process.

The nut fastener assembly provided in the present application can provide support between two panels, is easy to operate, and is adapted to a narrow operation space. In addition, in the present application, the nut assembly and the fastening clip are firmly connected and are not prone to separation during use or transportation. In the present application, the nut assembly and the fastening clip are easy to manufacture and have low costs.

DETAILED DESCRIPTION

Various specific embodiments of the present disclosure will be described below with reference to the accompanying drawings which constitute part of this description. It should be understood that although the terms indicating direction, such as "front", "rear", "upper", "lower", "left", "right", "inner", "outer", "top", "bottom", "forward", "opposite", "proximal end", "distal end", "transverse" and "longitudinal", are used in the present application to describe various exemplary structural parts and elements of the present application, these terms are used here merely for the purpose of convenience of description, and these terms are determined based on the exemplary orientations shown in the accompanying drawings. Since the embodiments disclosed in the present application can be arranged in different directions, these terms indicating directions are merely illustrative and should not be considered as limitations.

The ordinal numbers such as "first" and "second" used in the present application are merely used for distinguishing and identification, and do not have any other meanings. Unless otherwise specified, the ordinal numbers neither indicate a specific order, nor have a specific relevance. For example, the term "first component" itself does not imply the presence of "second component", and the term "second component" itself also does not imply the presence of "first component".

Figure 1A:
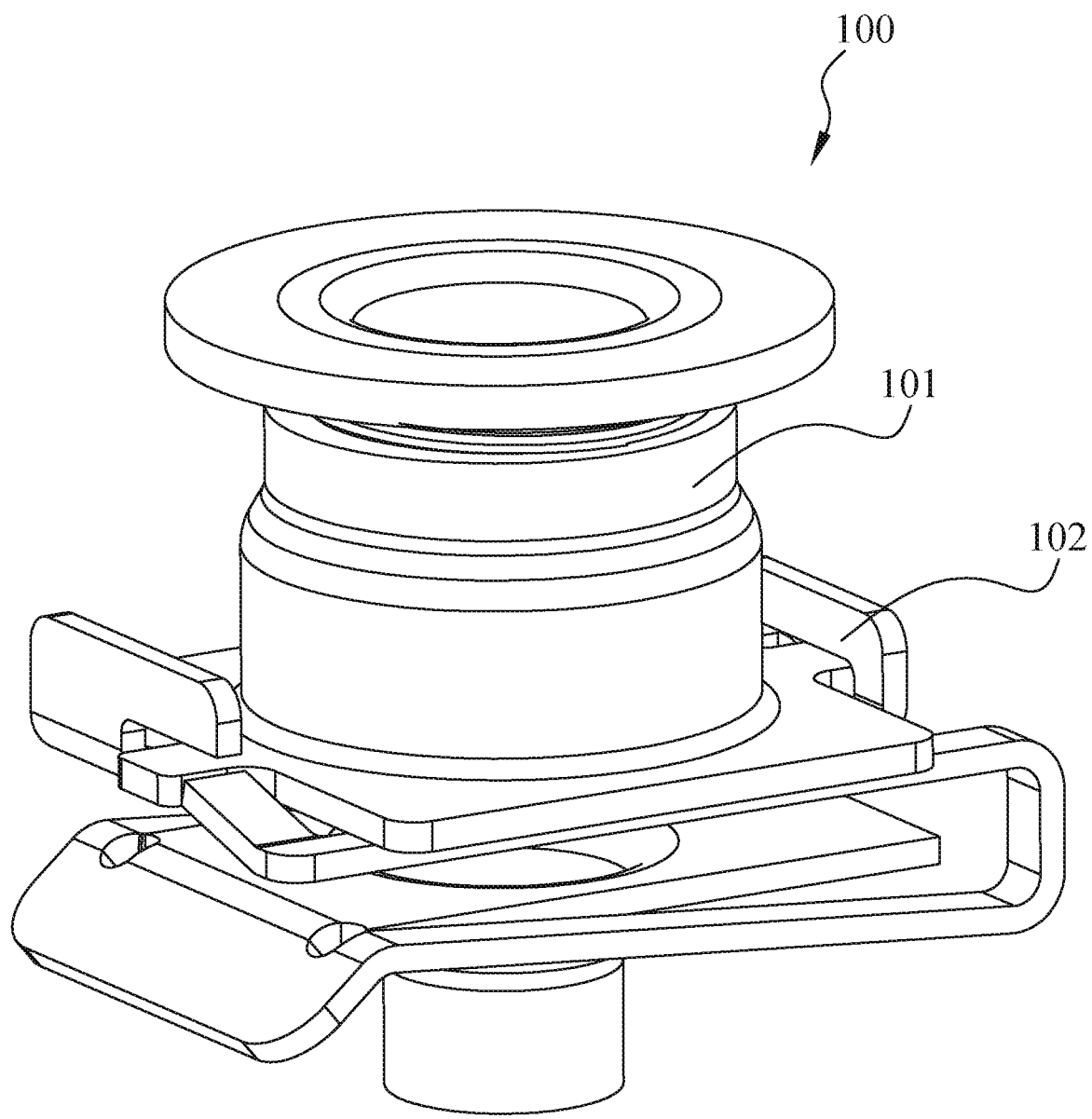
FIG. 1A is a perspective view of a nut fastener assembly according to one embodiment of the present application.
Figure 1B:
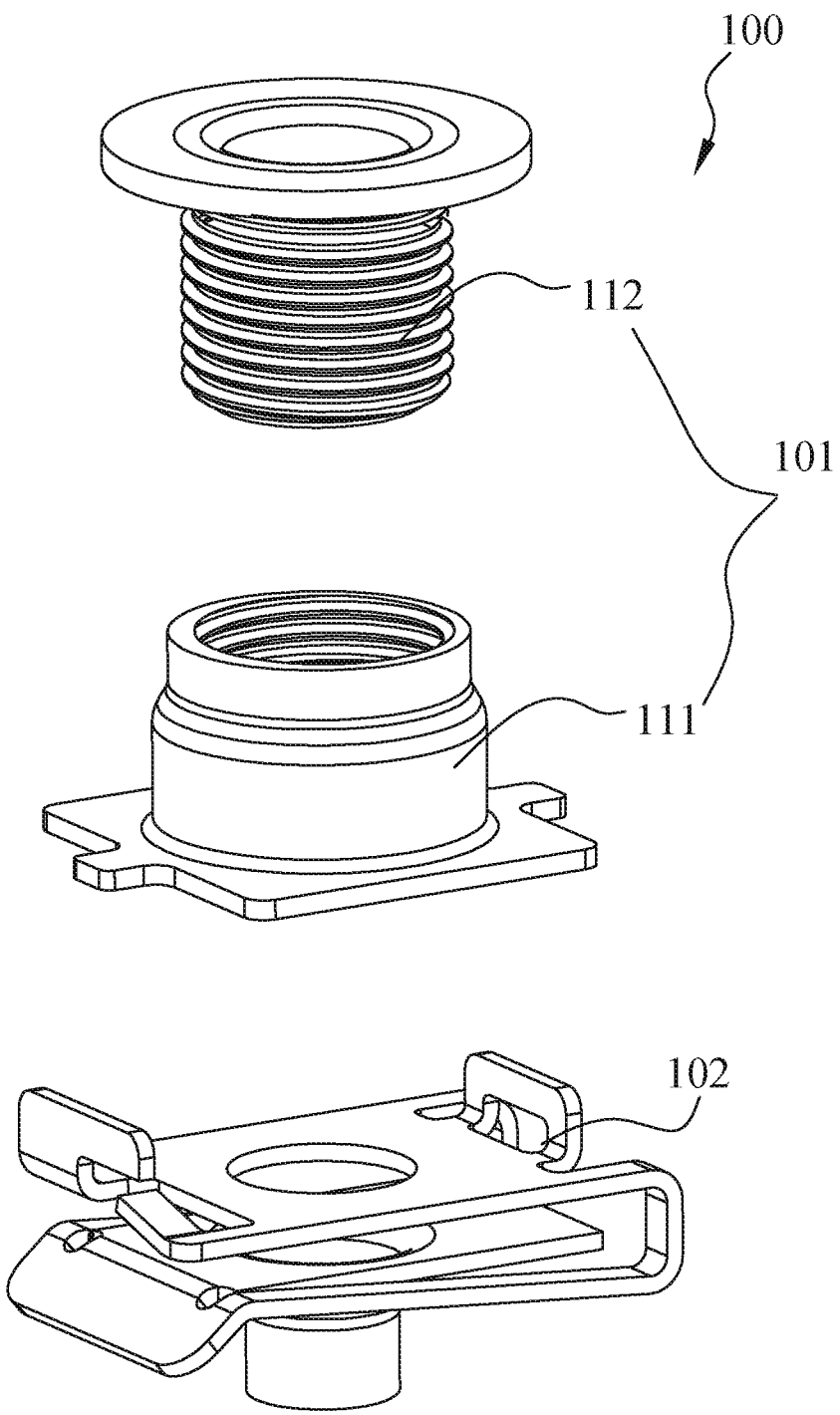
FIG. 1B is an exploded view of the nut fastener assembly in FIG. 1A.

FIG. 1A is a perspective view of a nut fastener assembly 100 according to one embodiment of the present application, and FIG. 1B is an exploded view of the nut fastener assembly 100 in FIG. 1A. As shown in FIGS. 1A and 1B, the nut fastener assembly 100 comprises a nut assembly 101 and a fastening clip 102, and the nut assembly 101 is mounted on the fastening clip 102. The fastening clip 102 can be mounted on a first panel 601 (see FIG. 6). The nut assembly 101 is located between the first panel 601 and a second panel 602 (see FIG. 6), and is used to provide support between the first panel 601 and the second panel 602, so as to prevent the first panel or the second panel from being deformed or collapsed due to the non-homogenous local force applied on the first panel 601 and the second panel 602 when the first panel 601 and the second panel 602 are connected by means of a fastener (e.g., a bolt). The nut assembly 101 comprises a nut 111 and a stud 112, and the nut 111 cooperates with the stud 112 via a thread such that the length of the nut assembly 101 can be adjusted to adapt to different distances between the first panel 601 and the second panel 602.

Figure 2A:
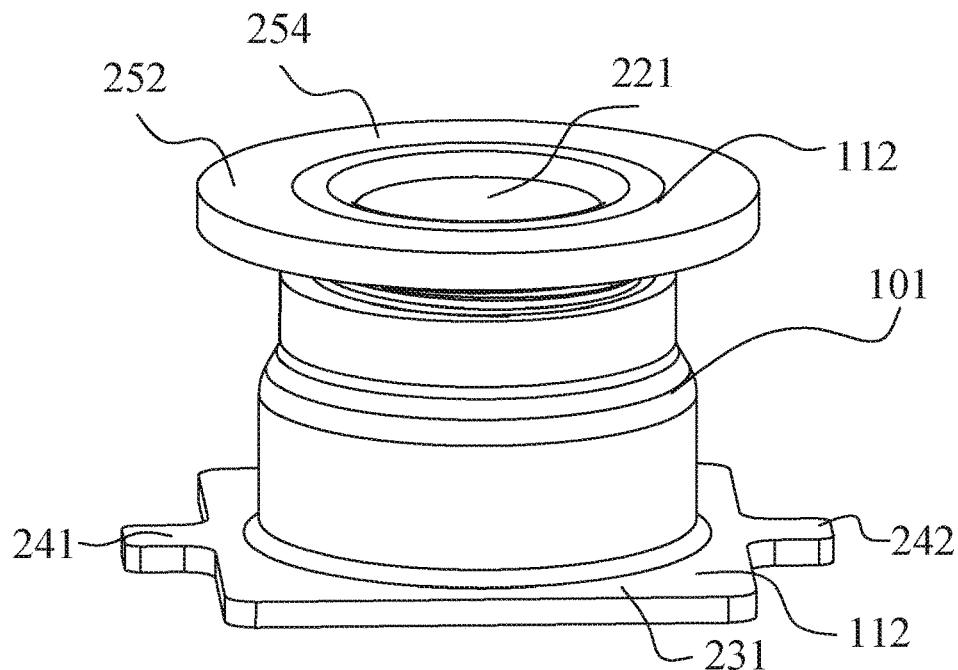
FIG. 2A is a perspective view of a nut assembly in FIG. 1B.
Figure 2B:
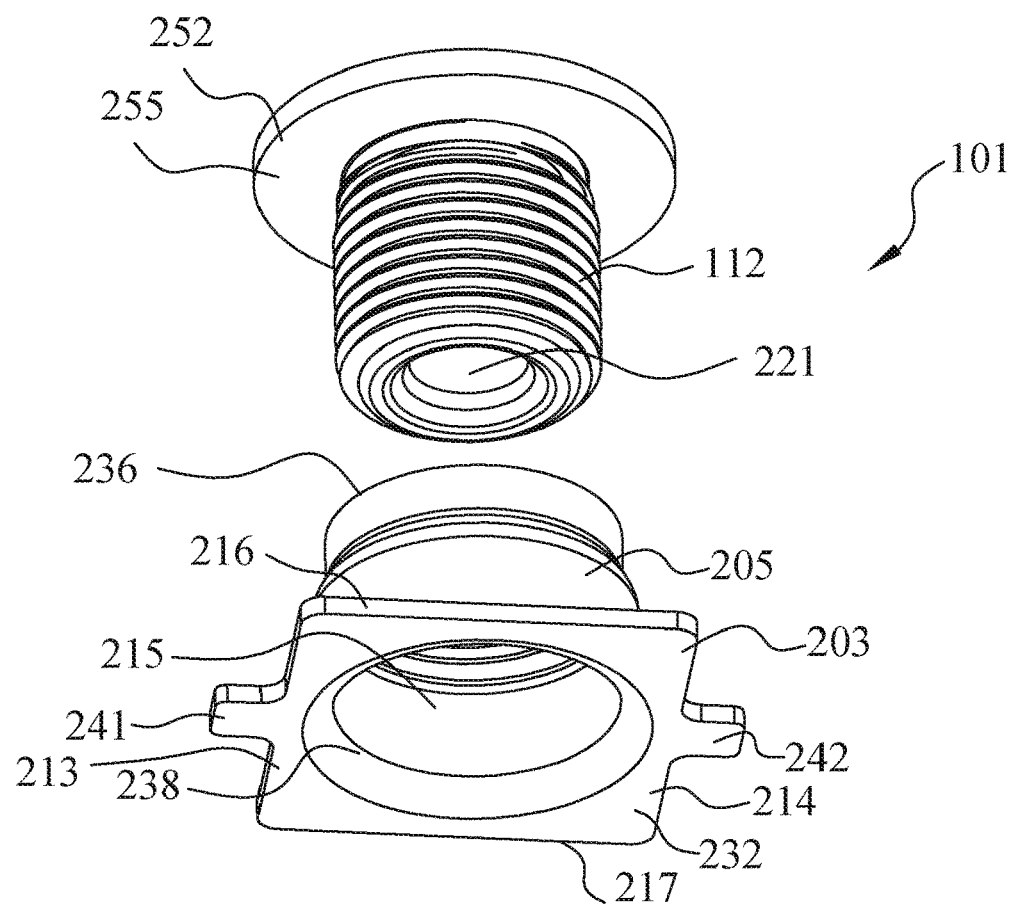
FIG. 2B is an exploded view of the nut assembly in FIG. 2A.

FIG. 2A is a perspective view of the nut assembly 101 in FIG. 1B, and FIG. 2B is an exploded view of the nut assembly 101 in FIG. 2A. As shown in FIGS. 2A and 2B, the nut 111 comprises a base plate 203 and a sleeve 205. The base plate 203 comprises an upper surface 231 and a lower surface 232. The sleeve 205 extends through the base plate 205. The top of the sleeve 205 is provided with an upper opening 236, and the bottom of the sleeve 205 is provided with a lower opening 238, with the lower opening 238 being flush with the lower surface 232 of the base plate 203. The inner wall of the sleeve 205 is provided with an internal thread so as to form a stud receiving channel 215. In one embodiment of the present application, the base plate 203 is generally square and has a first pair of side parts 213 and 214 and a second pair of side parts 216 and 217. The nut 111 is further provided with a pair of protrusions 241 and 242, which are formed by extending outwards from the outer edges of the first pair of side parts 213 and 214 of the base plate 203. The pair of protrusions 241 and 242 are symmetrically arranged and connected to the middle portions of the first pair of side parts 213 and 214. The pair of protrusions 241 and 242 are integrally formed with the base plate 203.

The outer surface of the stud 112 is provided with an external thread for cooperating with the internal thread of the nut 111, such that the stud 112 can be screwed into the nut 111 through the upper opening 236 of the sleeve 205 and enter the stud receiving channel 215, and the length of the nut fastener assembly 100 can be changed by means of the relative rotation of the stud 112 and the nut 111. The upper end of the stud 112 is provided with a support flange 252 that extends outwards from the outer surface thereof, and the support flange 252 has a support surface 254 and an inner surface 255 opposite the support surface 254. The support surface 254 of the support flange 252 is configured to support the second panel. The stud 112 is internally provided with a bolt receiving channel 221. The bolt receiving channel 221 is formed by penetrating the stud 112 in the axial direction of the stud 112.

Before the nut fastener assembly 100 is used, the nut assembly 101 assumes the shortest length. That is, the distance between the inner surface 255 of the support flange 252 of the stud 112 and the upper opening 236 of the sleeve 205 of the nut 111 is shortest. As such, the nut fastener assembly 100 can be easily disposed between the two panels. In some embodiments, the outer surface of the stud 112 is provided with an elastic ring near the support flange 252, so as to prevent the nut assembly 101 from being extended in length due to the unscrewing movement between the stud 112 and the nut 111 during transportation.

Figure 3A:
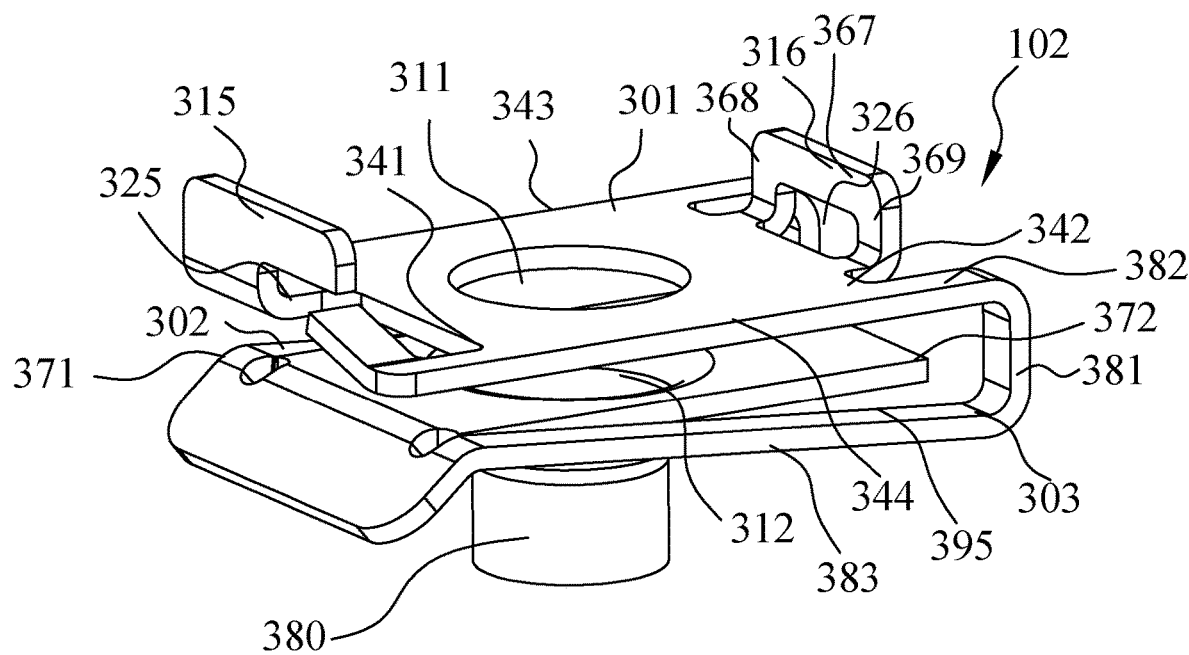
FIG. 3A is a perspective view of a fastening clip in FIG. 1B.
Figure 3B:
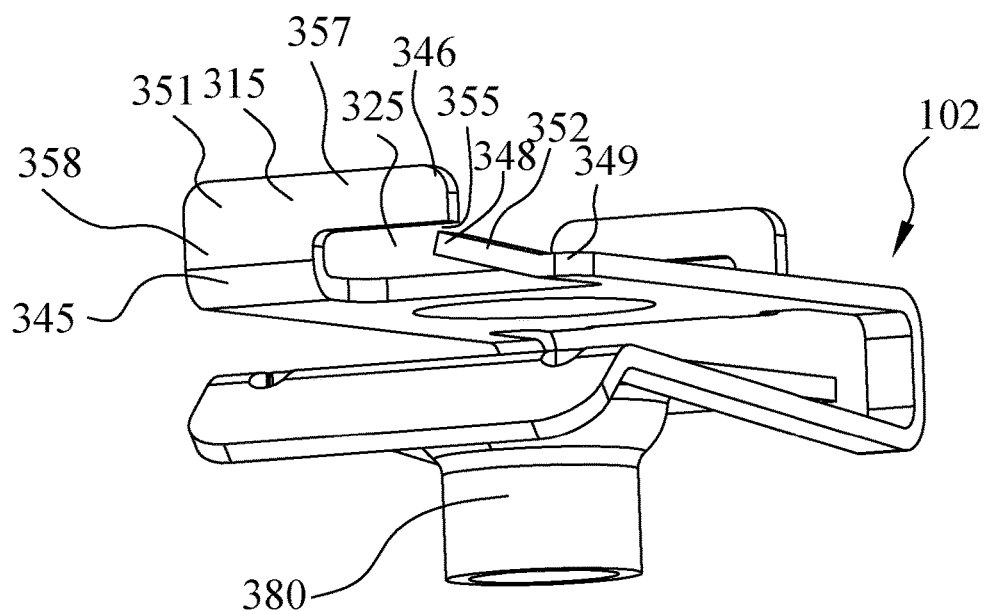
FIG. 3B is a perspective view of the fastening clip in FIG. 3A from another perspective.

FIG. 3A is a perspective view of the fastening clip 102 in FIG. 1B, and FIG. 3B is a perspective view of the fastening clip 102 in FIG. 3A from another perspective. As shown in FIGS. 3A and 3B, the fastening clip 102 comprises a first clip portion 301, a second clip portion 302 and an elastic arm 303. The first clip portion 301 and the second clip portion 302 are each substantially square sheet-shaped, and are connected by means of the elastic arm 303. There is a certain distance between the first clip portion 301 and the second clip portion 302, and the elastic arm 303 may have certain deformation, so as to adjust the distance between the first clip portion 301 and the second clip portion 302. When the elastic arm 303 is in a free state, the minimum distance between the first clip portion 301 and the second clip portion 302 of the fastening clip 102 is less than the thickness of the panel 601 connected to the fastening clip 102. The first clip portion 301 is provided with a through hole 311 that penetrates the first clip portion 301 from the upper surface to the lower surface thereof, with the through hole 311 being located in the middle of the first clip portion 301. The second clip portion 302 is provided with a through hole 312 that penetrates the second clip portion 302 from the upper surface to the lower surface thereof, with the through hole 312 being located in the middle of the second clip portion 302. When the nut assembly 101 is mounted on the fastening clip 102, the through hole 311, the through hole 312, and the bolt receiving channel 221 are aligned such that the bolt can pass through the bolt receiving channel 221, the through hole 311 and the through hole 312. In this embodiment, the diameters of the through hole 311 and the through hole 312 are both greater than the diameter of the bolt receiving channel 221.

The first clip portion 301 is substantially square, and has a first pair of side parts 341 and 342 arranged opposite each other and a second pair of side parts 343 and 344. The fastening clip 102 further comprises a pair of lugs 315 and 316. The pair of lugs 315 and 316 respectively extend upwards (i.e., towards the nut assembly) from the edges of the first pair of side parts 341 and 342. The lugs 315 and 316 are provided with receiving channels 325 and 326, respectively. The receiving channels 325 and 326 respectively penetrate the lugs 315 and 316 in the extension direction of the first clip portion 301. The receiving channels 325 and 326 are respectively configured to receive the protrusions 241 and 242 of the nut 111. The receiving channels 325 and 326 have a length in the extension direction of the first pair of side parts 341 and 342, and the receiving channels 325 and 326 have a height in the extension direction of the lugs 315 and 316. The length and the height of the receiving channels 325 and 326 are greater than the length and the height of the protrusions 241 and 242 in the respective directions, such that the protrusions 241 and 242 can move slightly in the receiving channels 325 and 326.

The lug 315 is an adjustable lug. The lug 315 comprises a blocking part 351 and an elastic part 352. The blocking part 351 comprises an extension part 357 and a connection part 358, with the extension part 357 being located above the receiving channel 325, the connection part 358 and the elastic part 352 being respectively located on two sides of the receiving channel 325, and the extension part 357 being connected to the first clip portion 301 by means of the connection part 358. The proximal end 345 of the blocking part 351 is formed at the interface between the connection part 358 and the first clip portion 301, and the free end of the extension part 357 forms the distal end 346 of the blocking part 351. The distal end 346 of the blocking part 351 extends towards the elastic part 352. In the vertical direction, the inner side of the elastic part 352 is substantially flush with the inner side of the blocking part 351. That is, the inside surface of the elastic part 352 and the inside surface of the blocking part 351 are substantially on the same plane transverse to the extension direction of the first clip portion 301.

The elastic part 352 has a distal end 348 and a proximal end 349, with the proximal end 349 being connected to the first clip portion 301, and the elastic part 352 obliquely extends upwards from the proximal end 349 of the elastic part 352 to the distal end 348 of the elastic part 352, that is, towards the distal end 346 of the blocking part 351. The proximal end 349 of the elastic part 352 is flush with the first clip portion 301, and the distal end 348 of the elastic part 352 is higher than the first clip portion 301. The cantilever structure of the elastic part 352 enables the elastic part 352 to have certain elasticity. When an external force is applied to the distal end 348 of the elastic part 352, the elastic part 352 can deform to deflect the distal end 348 downwards (or away from the distal end 346 of the blocking part 351). The distal end 348 of the elastic part 352 extends to a position below the distal end 346 of the blocking part 351 and has a certain distance from the distal end 346 of the blocking part 351, with the distance forming an inlet 355 of the receiving channel 325. When the elastic part 352 is in a free state, the height of the inlet 355 is less than the thickness of the protrusions 241 and 242. When a downward (i.e., away from the distal end of the blocking part 351) external force is applied to the distal end 348 of the elastic part 352, the elastic part 352 deforms such that the distal end 348 of the elastic part 352 moves away from the distal end 346 of the blocking part 351 so as to increase the height of the inlet 355. When the height of the inlet 355 is greater than the thickness of the protrusion 241, the protrusion 241 can enter the receiving channel 325 through the inlet 355. When the external force applied to the distal end 348 of the elastic part 352 is removed, the protrusion 241 is held in the receiving channel 325. For the lug 315, the receiving channel 325 is enclosed by the blocking part 351, the elastic part 352, and the first clip portion 301 together. The receiving channel 325 is in communication with the external environment through the inlet 355, such that the receiving channel 325 is not closed. The distance between the distal end 348 of the elastic part 352 and the connection part 358 is slightly greater than the width of the protrusion 241, and the distance between the bottom of the extension part 357 and the first clip portion 301 is slightly greater than the thickness of the protrusion 241.

The lug 316 is a fixed lug. The lug 316 comprises an extension part 367 and connection parts 368 and 369, with the extension part 367 being located above the receiving channel 325, the connection parts 368 and 369 being respectively located on two sides of the receiving channel 326, and the extension part 367 being connected to the first clip portion 301 by means of the connection parts 368 and 369. Therefore, the receiving channel 326 is enclosed by the connection part 368, the connection part 369, the extending portion 367 and the first clip portion 301. The receiving channel 326 is a closed space. The receiving channel 326 can be considered as a through hole penetrating the lug 316. The distance between the connection part 368 and the connection part 369 is slightly greater than the width of the protrusion 242. The distance between the bottom of the extension part 367 and the first clip portion 301 is slightly greater than the thickness of the protrusion 242.

The second clip portion 302 is substantially square, and has a first pair of side parts 371 and 372 arranged opposite each other and respectively arranged below the first pair of side parts 341 and 342 of the first clip portion 301. The elastic arm 303 comprises a front section 382, a middle section 381 and a rear section 383, with the front section 382 being separately connected to the side part 342 of the first clip portion and the middle section 381, and the rear section 383 being separately connected to the middle section 381 and the side part 371 of the second clip portion 302. The front section 382 extends in the same direction as the first clip portion 301, and the middle section 381 extends substantially perpendicular to the first clip portion 301 or extends from the front section 382 at a certain angle with respect to the first clip portion 301. The middle section 381 is located on one side of the first clip portion 301 and the second clip portion 302. The height of the middle section 381 is greater than the distance between the first clip portion 301 and the second clip portion, the rear section 383 obliquely extends downwards from the side part 371 until it is connected to the bottom of the middle section 381, that is, the rear section 383 is not higher than the plane where the second clip portion 302 is located. One end of the rear section 383 in the lengthwise direction is connected to the side part 371 of the second clip portion 302, and the inside edge 395 of the rear section 383 in the lengthwise direction is separated from the second clip portion 302, such that the elastic arm 303 has a long moment arm and is prone to deformation. In this embodiment, there are two elastic arms 303 respectively arranged at two ends of the side part 342. The middle sections of the elastic arms 303 are located on one side of the side part 342, such that the space between the first clip portion 301 and the second clip portion 302 has openings on three directions, and the panel can be inserted into the fastening clip 102. The second clip portion 302 is provided with a sleeve 380 that is formed by extending downwards from the edge of the through hole 312, and the inner side of the sleeve 380 is provided with an internal thread by which it can cooperate with a fastener (e.g., a bolt).

Figure 4A:
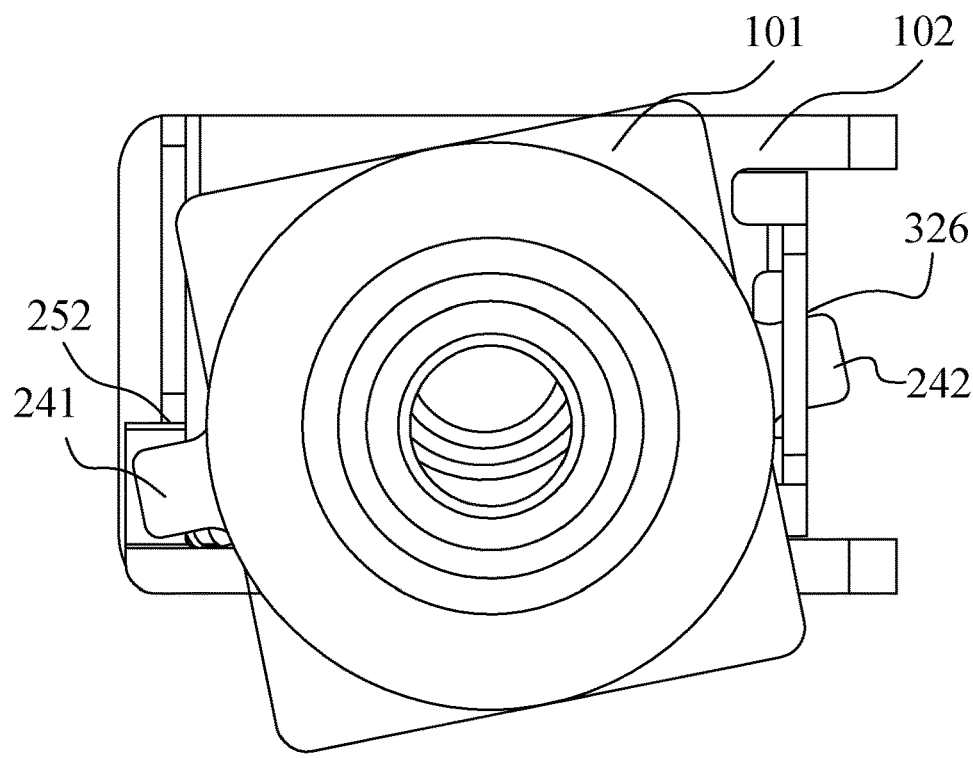
FIG. 4A is a top view of the nut assembly when in a pre-mounting position relative to the fastening clip.
Figure 4B:
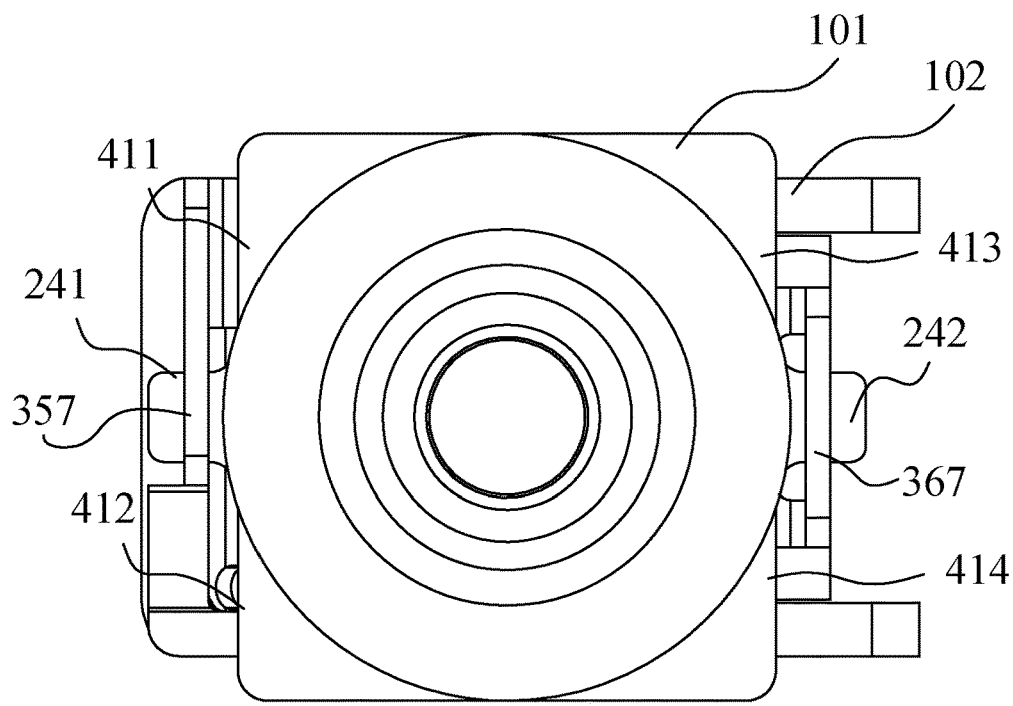
FIG. 4B is a top view of the nut assembly when being mounted in place relative to the fastening clip.

FIG. 4A is a top view of the nut assembly 101 when in a pre-mounting position relative to the fastening clip, and FIG. 4B is a top view of the nut assembly 101 when being mounted in place relative to the fastening clip 102. As shown in FIGS. 3A to 4B, during the connection of the nut assembly 101 to the fastening clip 102, the protrusion 242 is firstly inserted into the receiving channel 326, and the protrusion 241 is disposed above the elastic part 352. At this time, the elastic part 352 is in a free state, and the thickness of the protrusion 241 is greater than the height of the inlet 355. Then, an external force is applied to the nut assembly 101 towards the fastening clip 102, and the protrusion 241 applies an external force to the elastic part 352 towards the first clip portion 301, such that the distal end 348 of the elastic part 352 deflects towards the first clip portion 301 to increase the height of the inlet 355. When the height of the inlet 355 is greater than or equal to the thickness of the protrusion 241, if the nut assembly is rotated clockwise as shown in FIGS. 4A-4B, the protrusion 241 enters the receiving channel 325 through the inlet 355. At this time, the external force applied to the nut assembly 101 is removed, the elastic part 352 returns to the free state, and the protrusion 241 cannot escape from the receiving channel 325 in the counterclockwise direction, such that the nut assembly 101 is held in the fastening clip 102.

As shown in FIG. 4B, the base plate 203 forms a pair of limiting parts 411 and 412 on two sides of the protrusion 241, and the extension directions of the limiting parts 411 and 412 are substantially consistent with the extension direction of the inner side of the lug 315. When the nut assembly 101 is mounted in place on the fastening clip 102, there is a small distance between the pair of limiting parts 411 and 412 and the inner side of the lug 315, such that the nut assembly 101 can move slightly relative to the fastening clip 102, but cannot rotate dramatically. Similarly, the base plate 203 also forms a pair of limiting parts 413 and 414 on two sides of the protrusion 242, which can play the same role. In other embodiments, only a pair of limiting parts can prevent the nut assembly 101 from rotating dramatically relative to the fastening clip 102.

Figure 5:
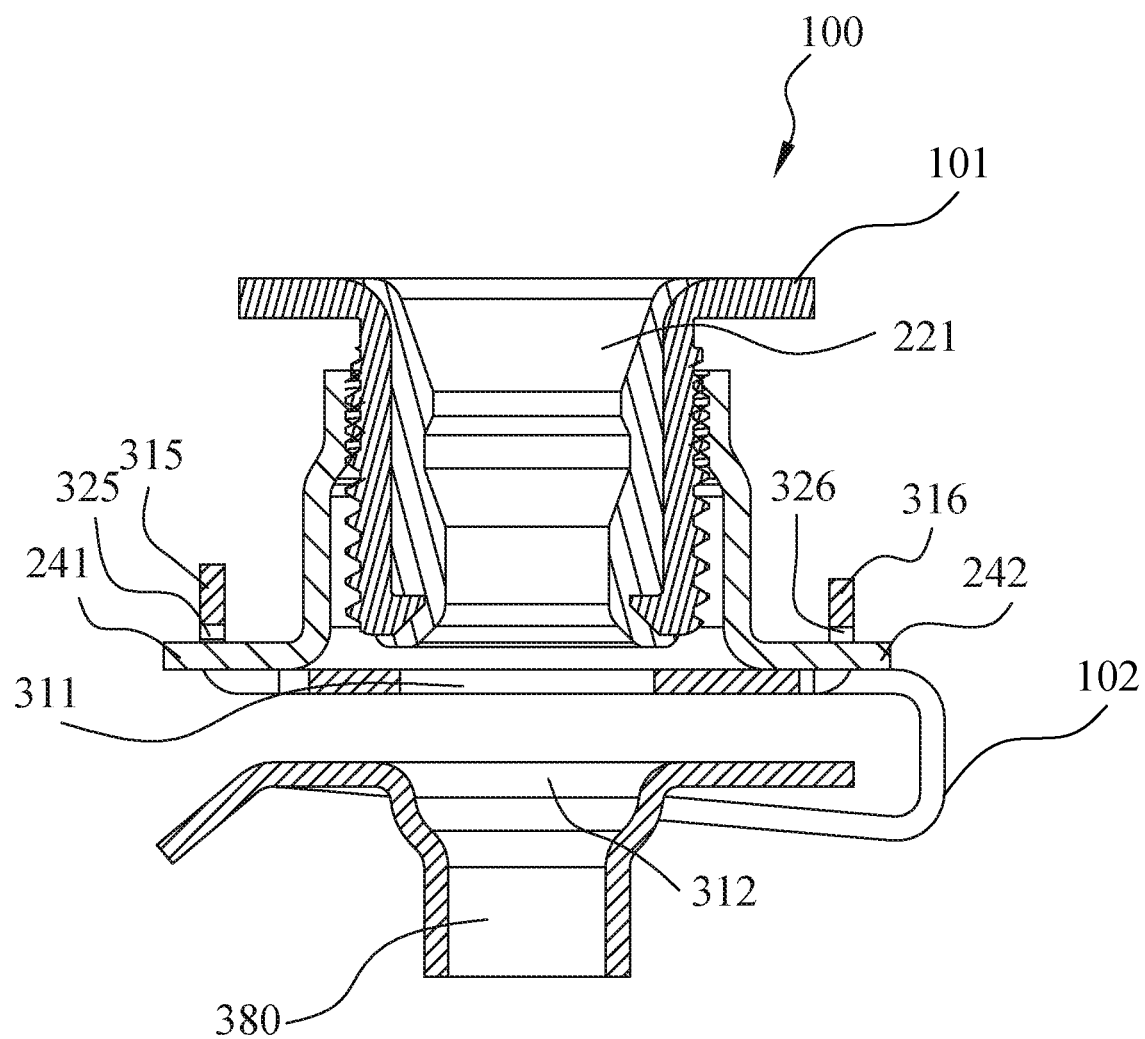
FIG. 5 is a cross-sectional view of the nut fastener assembly in FIG. 1A.

FIG. 5 is a cross-sectional view of the nut fastener assembly 100 in FIG. 1A. As shown in FIG. 5, when the nut assembly 101 is mounted in place in the fastening clip 102, the distance between the outer edges of the pair of protrusions 241 and 242 is greater than the distance between the pair of lugs 315 and 316. That is, the pair of protrusions 241 and 242 respectively pass through and extend out of the receiving channels 315 and 326. As such, the nut assembly 101 is reliably connected to the fastening clip 102, and the nut assembly 101 is not prone to escape from the fastening clip 102 in the axial direction of the nut assembly 101. The bolt receiving channel 221 of the nut assembly 101 is coaxially aligned with the through hole 311, the through hole 312, and the sleeve 380. The length and the thickness of the pair of protrusions 241 and 242 are respectively less than the length and the thickness of the respective receiving channels 325 and 326, such that the nut assembly 101 can move slightly relative to the fastening clip 102, so as to be able to adjust the coaxiality of the bolt receiving channel 221 with the through hole 311 of the fastening clip 102 and the sleeve 380.

Figure 6:
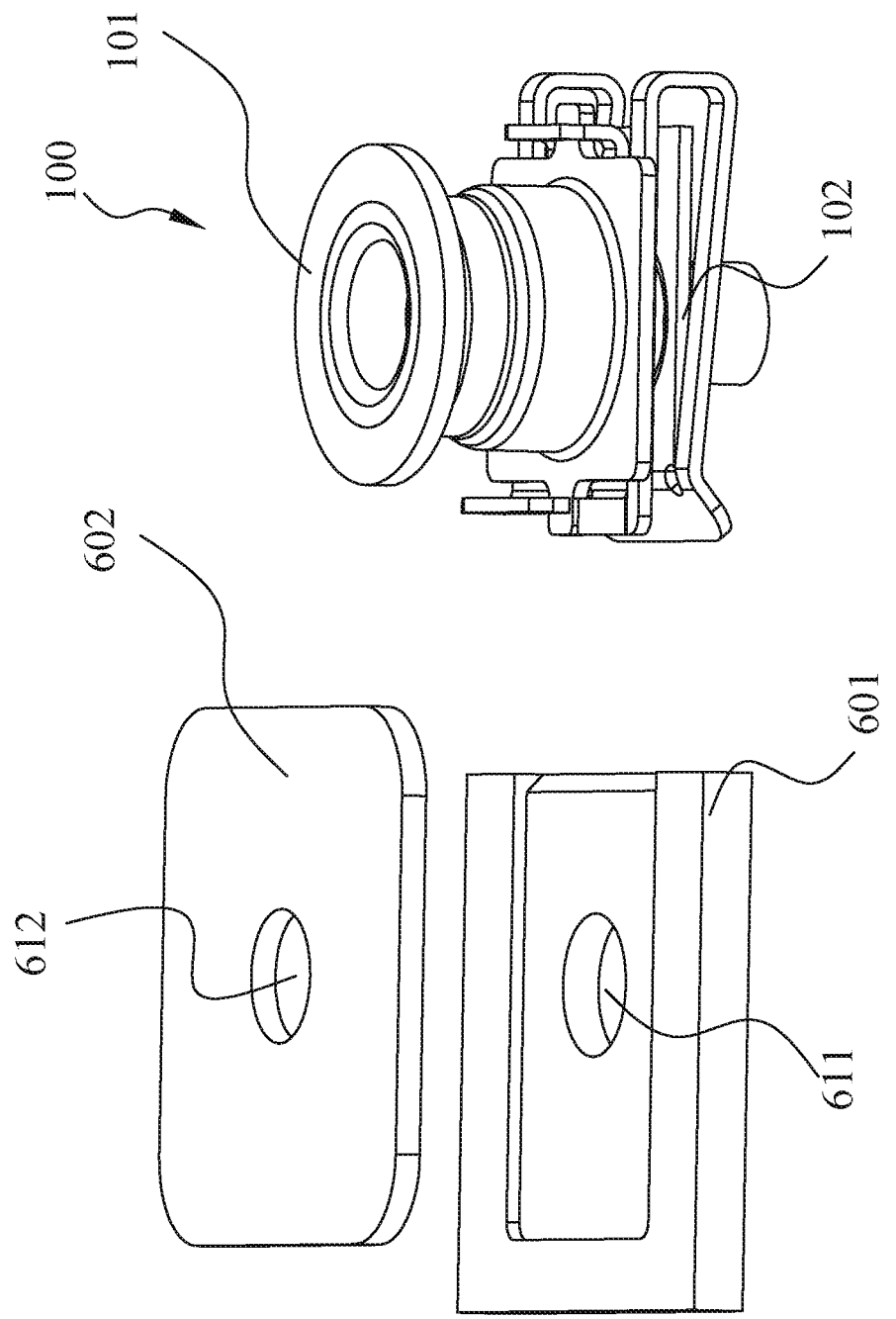
FIG. 6 is a perspective view of the nut fastener assembly and two panels to be fixed.

FIG. 6 shows the nut fastener assembly 100 and two panels to be fastened. As shown in FIG. 6, the nut fastener assembly 100 is mounted between the first panel 601 and the second panel 602. The first panel 601 and the second panel 602 are provided with mounting holes 611 and 612, respectively. When the nut fastener assembly 100 is mounted, an opening on the side of the fastening clip 102 that is opposite the elastic arm 303 is aligned with the second panel 602, and an external force is applied to the nut fastener assembly 100, such that the first panel 601 enters the space between the first clip portion 301 and the second clip portion 302, and the through holes 311 and 312 are aligned with the mounting hole 611. The nut fastener assembly 100 assumes a pre-mounted state.

Figure 7A:
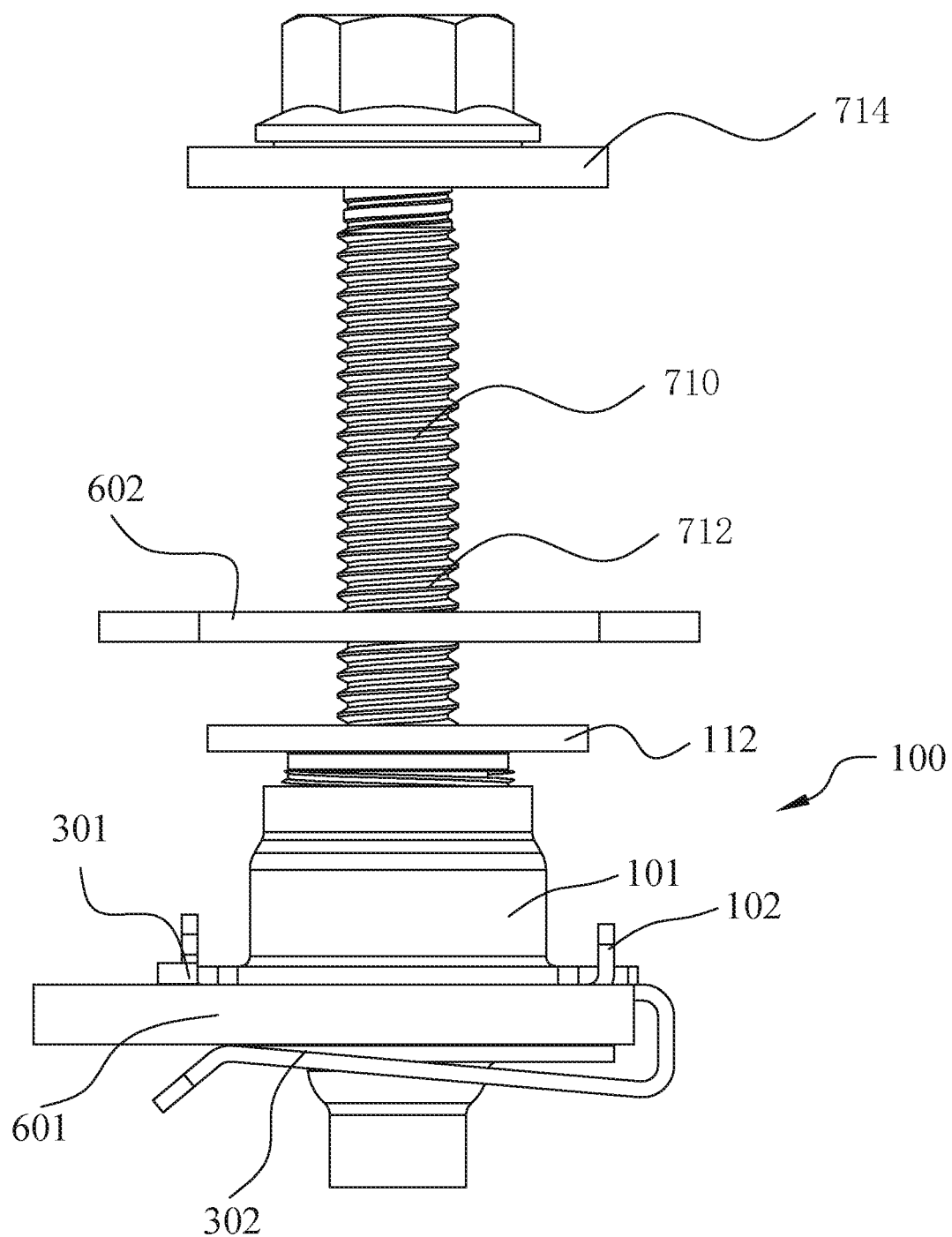
FIG. 7A is a diagram of the nut fastener assembly in an initial mounting state.
Figure 7B:
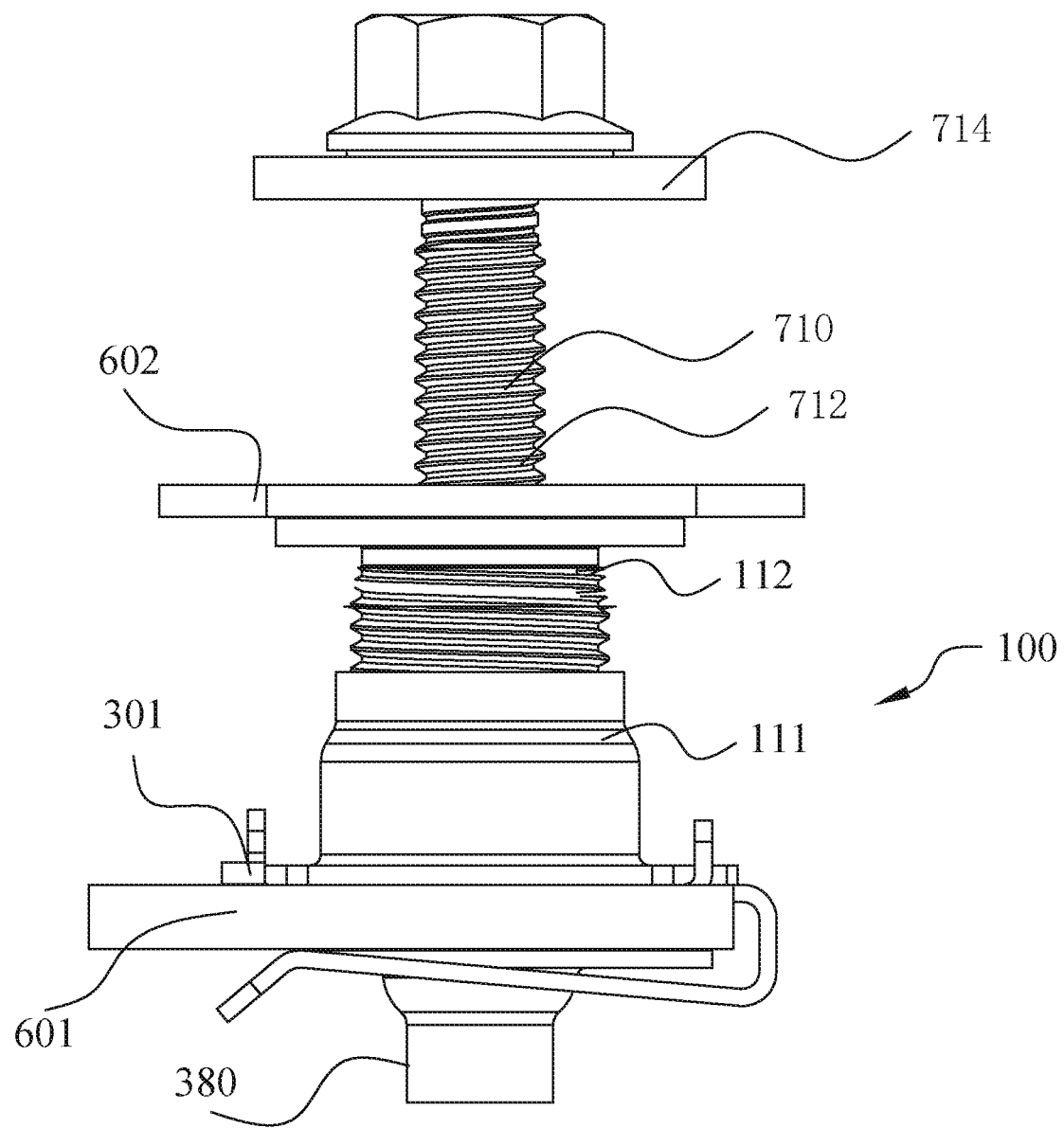
FIG. 7B is a diagram of the nut fastener assembly in an intermediate mounting state.
Figure 7C:
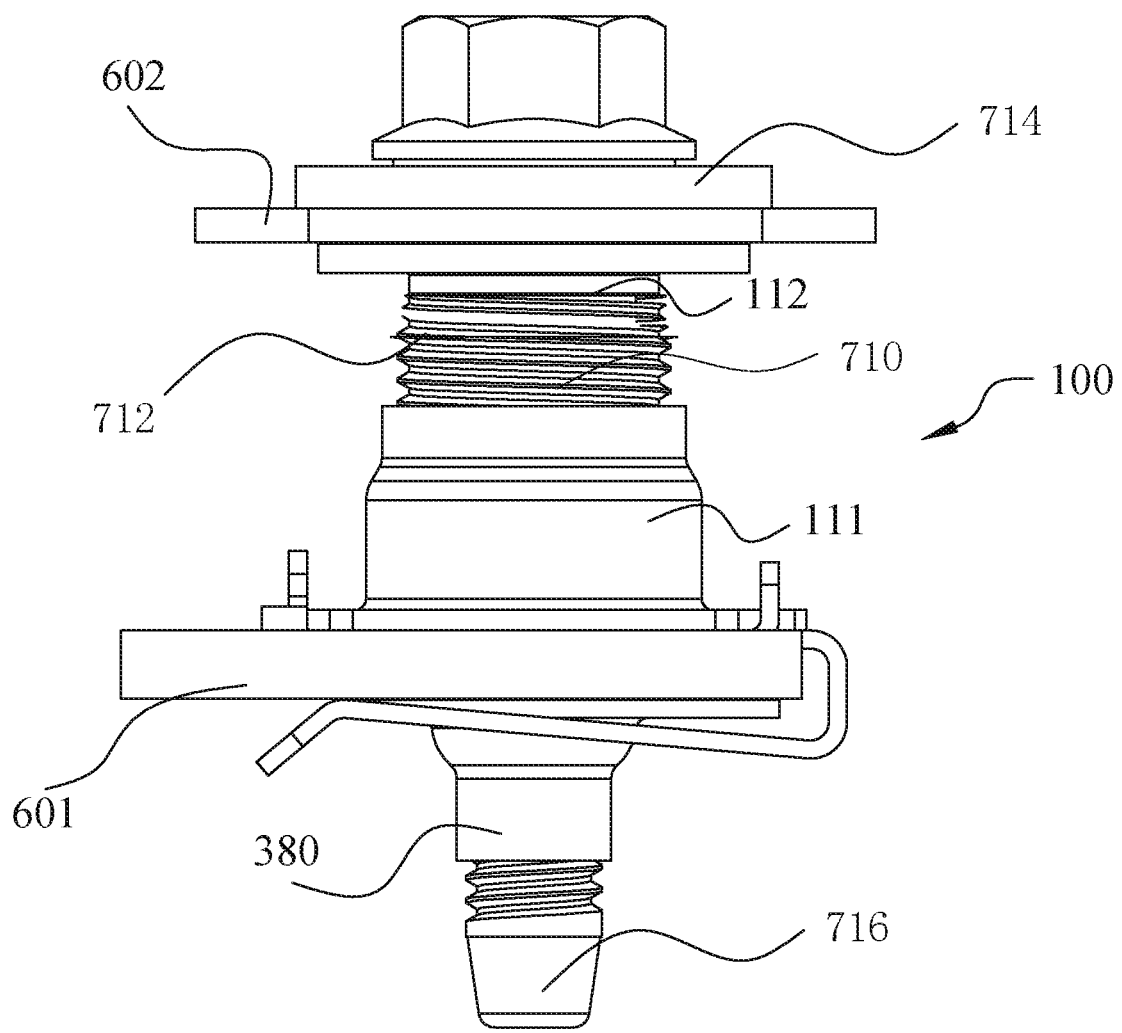
FIG. 7C is a diagram for the nut fastener assembly in a final mounting state.

FIGS. 7A to 7C show a mounting process of the nut fastener assembly 100, in which FIG. 7A shows an initial mounting state of the nut fastener assembly 100 in, FIG. 7B shows an intermediate mounting state of the nut fastener assembly 100, and FIG. 7C shows the final mounting state of the nut fastener assembly 100. In FIGS. 7A-7C, a fastener is used to mount the nut fastener assembly 100. In this embodiment, the fastener is a bolt 710, and the bolt 710 comprises a threaded rod 712 and a head 714 arranged at one end of the threaded rod 712. The threaded rod 712 further has a free end 716 (see FIG. 7C).

As shown in FIG. 7A, when the nut fastener assembly 100 is in the initial mounting state, the nut fastener assembly 100 is mounted on the first panel 601. The elastic arm 303 of the fastening clip 102 has a certain deformation, such that the first clip portion 301 and the second clip portion 302 apply a certain elastic force to the first panel 601, such that the nut fastener assembly 100 is held on the first panel 601 and is not prone to moving relative to the first panel 601. The second panel 602 is located above the nut assembly 101, the nut assembly 101 assumes the shortest state, and there is a certain distance between the stud 112 and the second panel 602. The nut fastener assembly 100 is appropriately adjusted, such that the first mounting hole 611, the bolt receiving channel 221, the through holes 311 and 312, the sleeve 380, and the second mounting hole 612 are coaxially aligned.

The bolt 710 is sequentially inserted into the mounting hole 612 of the second panel 602 and the bolt receiving channel 221 of the nut fastener assembly 100. At this time, the threaded rod 712 of the bolt 710 is in contact with the internal surface of the bolt receiving channel 221. Then, the bolt 710 is rotated, and the threaded rod 712, the external thread of the stud 112 and the internal thread of the nut 111 are configured such that, when the threaded rod 712 of the bolt 710 is gradually rotated and screwed into the bolt receiving channel 221, under the frictional force between the bolt receiving channel 221 and the threaded rod 712, the stud 112 moves towards the second panel 602 as the bolt 710 rotates until the stud is blocked by the second panel 602 and cannot continue to move downwards, that is, the stud reaches the position shown in FIG. 7B.

As shown in FIG. 7B, at this time, since the stud 112 is blocked by the second panel 602 and cannot continue to move downwards, the stud 112 no longer rotates relative to the nut 111 even if the bolt 710 continues to rotate. If the bolt 710 continues to rotate at the position shown in FIG. 7B, the bolt 710 will continue to rotate relative to the stud 112 and move downwards, and then sequentially pass through the mounting holes 611 and enter the sleeve 380. The internal thread of the sleeve 380 is configured to be able to cooperate with the external thread of the bolt 710. By means of continuing to rotate the bolt 710, the nut fastener assembly 100, the first panel 601 and the second panel 602 can be fastened together to complete mounting of the nut fastener assembly 100.

As shown in FIG. 7C, when the bolt 710 is mounted in place, the head 714 of the bolt 710 is in contact with the second panel 602 and, thus, cannot continue to move downwards, and the free end 716 of the bolt 710 passes through the sleeve 380 and protrudes beyond the sleeve 380. The nut fastener assembly 100 is supported between the first panel 601 and the second panel 602, and with the threaded fitting of the bolt 710 and the sleeve 380, the nut fastener assembly 100 cannot move relative to the first panel 601 and the second panel 602.

In the present application, the sleeve 380 functions as a nut that cooperates with the bolt 710, and when an operator operates the nut fastener assembly 100, there is no need to mount a nut below the first panel 601, which can be adapted to a narrow mounting space. In one embodiment of the present application, the first panel 601 is connected to a vehicle light, and the second panel is sheet metal of the vehicle. The vehicle light can be fixed to the sheet metal of the vehicle by means of the nut fastener assembly 100.

In the present application, the nut 111, the stud 112, and the fastening clip 102 are all integrally formed of a metal material by means of a stamping process. In other embodiments, the nut 111, the stud 112, and the fastening clip 102 may also be integrally formed of a plastic material by means of an injection molding process. In some embodiments, the nut 111 and the fastening clip 102 are integrally formed or fixedly connected. Compared with the present application, such design cannot readily achieve the coaxiality of the bolt receiving channel 221 and the sleeve 205 and has high machining requirements. In the present application, the nut 111 and the fastening clip 102 are separately formed, and by means of providing the nut assembly 101 with the protrusions and correspondingly providing the fastener with the lugs, the nut 111 and fastening clip 102, which are separately formed, can be connected together. In addition, by means of configuring at least one of the lugs as an adjustable lug, it is possible to adjust the relative positions of the bolt receiving channel 221 and the sleeve 205 within a certain range, so as to reduce the requirements for machining accuracy of the nut 111 and the fastening clip 102. In the design in which the nut 111 and the fastening clip 102 are separately formed, it is necessary to ensure that the connection between the nut 111 and the fastening clip 102 is easy to operate and, during transportation and use, the nut 111 and the fastening clip 102 are connected reliably and not prone to escape. The fastener assembly 101 provided in the present application can meet this requirement.

Although only some features of the present application are illustrated and described herein, those skilled in the art would have made various improvements and changes. Therefore, it should be understood that the appended claims are intended to encompass all the above improvements and changes that fall within the substantial spirit and scope of the present application.

The invention claimed is:

1. A nut fastener assembly, comprising:
a nut assembly, the nut assembly including a base plate, the base plate including a pair of protrusions; and
a fastening clip, the fastening clip comprising:
  a first clip portion;
  a pair of lugs, the pair of lugs extending upward from edges of the first clip portion; and
  a pair of receiving channels, the pair of lugs provided with the pair of receiving channels respectively and configured to respectively receive the pair of protrusions of the nut assembly such that the nut assembly is connected to the first clip portion,
wherein at least one of the pair of lugs is an adjustable lug, the adjustable lug comprising a blocking part and an elastic part,
wherein the elastic part includes a proximal end and a distal end, the elastic part extending obliquely upwards from the proximal end of the elastic part to the distal end of the elastic part, the proximal end connected to the first clip portion along a first side wall,
wherein the blocking part includes a connection part and an extension part that is formed integrally with each other, the extension part connected to the first clip portion by means of the connection part, the extension part including a free end and the connection part connected to the first clip portion along a second side wall opposite of the first side wall,
wherein the distal end of the elastic part and the free end of the blocking part is separated by a gap,
wherein at least one of the pair of lugs is a fixed lug, the fixed lug disposed opposite of the adjustable lug and between a pair of arms, the pair of arms connecting the first clip portion to a second clip portion,
wherein the elastic part deflects downward relative to the free end of the blocking part, and
wherein the fastening clip is integrally formed of a metal material.

2. A nut fastener assembly, comprising:
a nut assembly, with opposite sides of a bottom of the nut assembly being provided with a pair of protrusions; and
a fastening clip, the fastening clip comprising:
  a first clip portion;
  a second clip portion, the first clip portion and the second clip portion connected by two elastic arms;
  a pair of lugs, the pair of lugs being respectively arranged on opposite ends of the first clip portion and extending toward the nut assembly; and
  a pair of receiving channels, the pair of lugs provided with the pair of receiving channels respectively and configured to respectively receive the pair of protrusions of the nut assembly such that the nut assembly is connected to the first clip portion,
  wherein at least one of the pair of lugs is an adjustable lug; the adjustable lug comprises a blocking part and an elastic part; a proximal end of the blocking part and a proximal end of the elastic part are separately connected to the first clip portion on opposite sides of the corresponding receiving channel; a distal end of the blocking part and a distal end of the elastic part extend toward each other; the distal end of the elastic part is configured to be movable relative to the distal end of the blocking part under the drive of an external force, such that the corresponding protrusion in the pair of protrusions enters the corresponding receiving channel through a space between the distal end of the blocking part and the distal end of the elastic part; and when the distal end of the elastic part is in a free state, the protrusion having entered the receiving channel is held in the receiving channel by the distal end of the elastic part, wherein the elastic part obliquely extends upwards from the proximal end of the elastic part to the distal end of the elastic part, with the distal end of the elastic part being higher than the first clip portion, wherein the distal end of the elastic part and the distal end of the blocking part are separated by a gap, and wherein a portion of the distal end of the blocking part extends above the distal end of the elastic part.

3. The nut fastener assembly of claim 2, wherein the distal end of the elastic part extends to a position below the distal end of the blocking part and an inlet in communication with the receiving channel is defined between the distal end of the elastic part and the distal end of the blocking part; and a height of the inlet is adjustable as the distal end of the elastic part moves, and when the distal end of the elastic part is in the free state, the height of the inlet is less than a thickness of the corresponding protrusion in the pair of protrusions.

4. The nut fastener assembly of claim 2, wherein the blocking part comprises an extension part located above the receiving channel and a connection part connecting the extension part to the first clip portion, with the connection part and the elastic part being respectively located on the opposite sides of the receiving channel.

5. The nut fastener assembly of claim 2, wherein the pair of protrusions are sized such that, after the nut assembly is mounted in place in the fastening clip, the pair of protrusions are capable of protruding out of the pair of receiving channels.

6. The nut fastener assembly of claim 2, wherein a length of the receiving channels is greater than that of the pair of protrusions, such that the nut assembly is capable of rotating a certain angle in the receiving channels.

7. The nut fastener assembly of claim 2, wherein an inner side of the elastic part is flush with an inner side of the blocking part.

8. The nut fastener assembly of claim 7, wherein the bottom of the nut assembly is provided with limiting parts which are respectively located on two sides of each of the pair of protrusions; and the limiting parts are configured to cooperate with an inner side of the pair of lugs to limit the rotation of the nut assembly.

9. The nut fastener assembly of claim 2, wherein one of the pair of lugs is the adjustable lug, and the other is a fixed lug; the fixed lug comprises an extension part located above the receiving channel, and a first connection part and a second connection part which connect the extension part to the first clip portion; and the first connecting portion and the second connecting portion are respectively located on the opposite sides of the receiving channel.

10. The nut fastener assembly of claim 2, wherein the fastening clip is integrally formed of a metal material by means of a stamping process or is integrally formed of a plastic material by means of an injection molding process.

* * * * *